Jan. 15, 1963  E. V. GARNETT  3,073,574
WIRE STRINGING EQUIPMENT
Filed Feb. 19, 1960  13 Sheets-Sheet 1

INVENTOR.
EDWARD V. GARNETT
BY
Horace B Van Valkenburgh
ATTORNEY

Jan. 15, 1963  E. V. GARNETT  3,073,574
WIRE STRINGING EQUIPMENT
Filed Feb. 19, 1960  13 Sheets-Sheet 2

INVENTOR.
EDWARD V. GARNETT
BY
*Horace B Van Valkenburgh*
ATTORNEY

Jan. 15, 1963 E. V. GARNETT 3,073,574
WIRE STRINGING EQUIPMENT
Filed Feb. 19, 1960 13 Sheets-Sheet 3

INVENTOR.
EDWARD V. GARNETT
BY
Horace B. Van Valkenburgh
ATTORNEY

INVENTOR.
EDWARD V. GARNETT
BY
ATTORNEY

Jan. 15, 1963 E. V. GARNETT 3,073,574
WIRE STRINGING EQUIPMENT
Filed Feb. 19, 1960 13 Sheets-Sheet 5
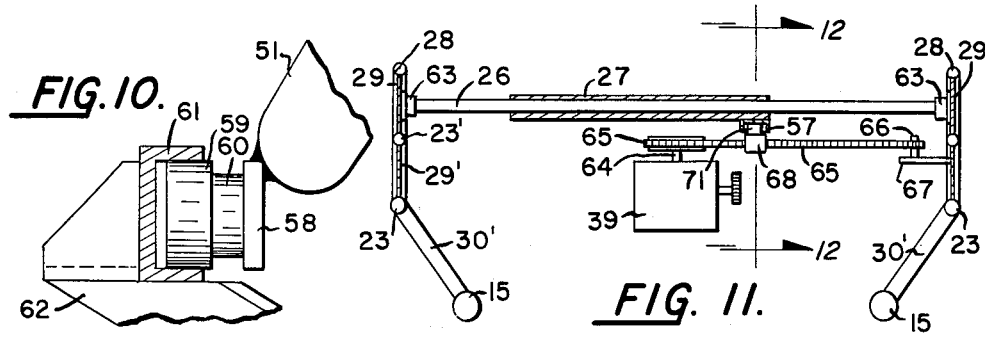
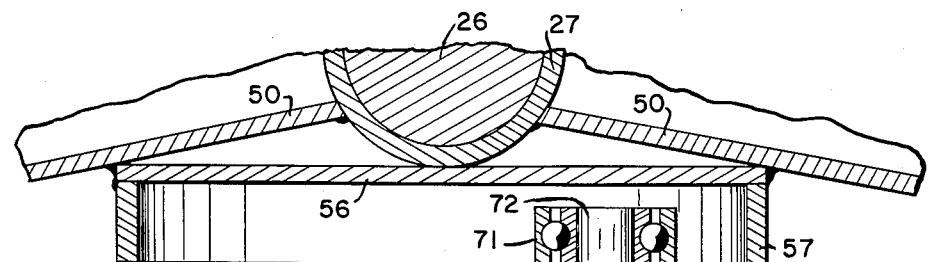
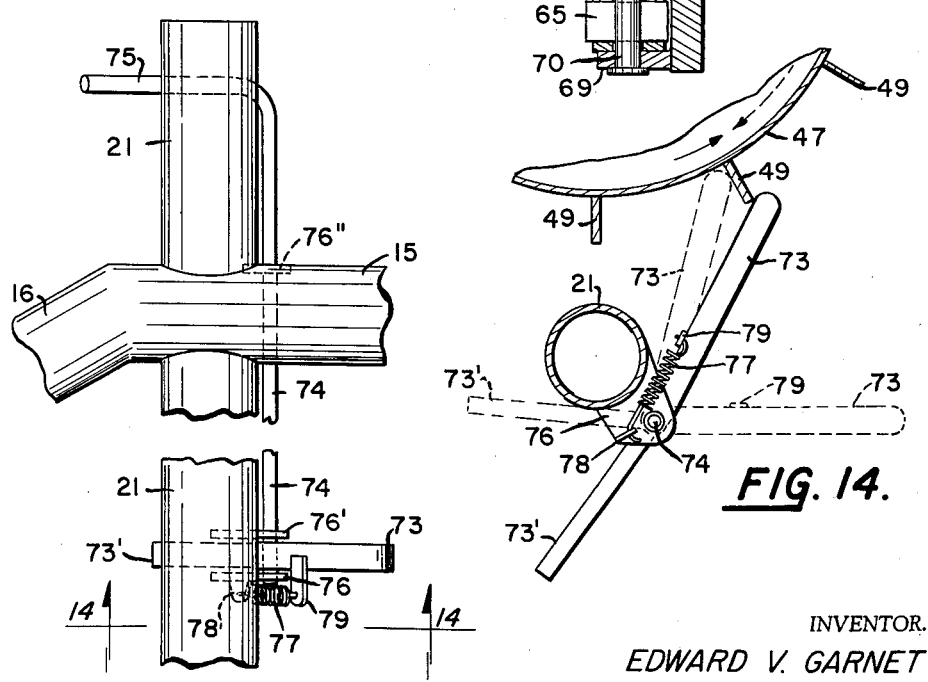
INVENTOR.
EDWARD V. GARNETT
BY
Horace B. Van Valkenburgh
ATTORNEY Jan. 15, 1963

E. V. GARNETT 3,073,574

WIRE STRINGING EQUIPMENT

Filed Feb. 19, 1960

INVENTOR.
EDWARD V. GARNETT
BY

ATTORNEY

Jan. 15, 1963     E. V. GARNETT     3,073,574
WIRE STRINGING EQUIPMENT
Filed Feb. 19, 1960                          13 Sheets-Sheet 7

INVENTOR.
EDWARD V. GARNETT
BY
Horace B. Van Valkenburgh
ATTORNEY

Jan. 15, 1963  E. V. GARNETT  3,073,574
WIRE STRINGING EQUIPMENT
Filed Feb. 19, 1960  13 Sheets-Sheet 8

INVENTOR.
EDWARD V. GARNETT
BY
Horace B. Van Valkenburgh
ATTORNEY

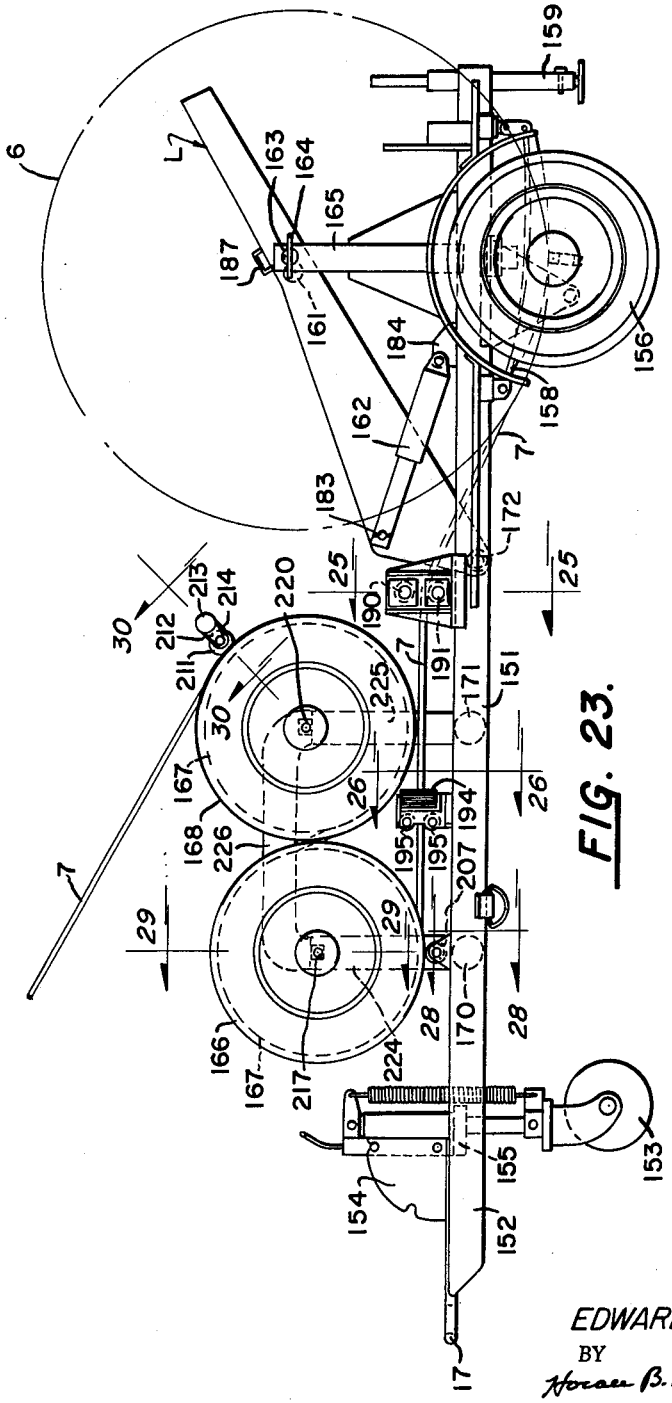

Jan. 15, 1963  E. V. GARNETT  3,073,574
WIRE STRINGING EQUIPMENT
Filed Feb. 19, 1960  13 Sheets-Sheet 12

INVENTOR.
EDWARD V. GARNETT
BY
Horace B. Van Valkenburgh
ATTORNEY

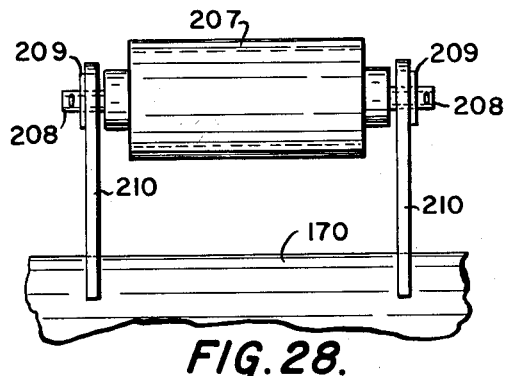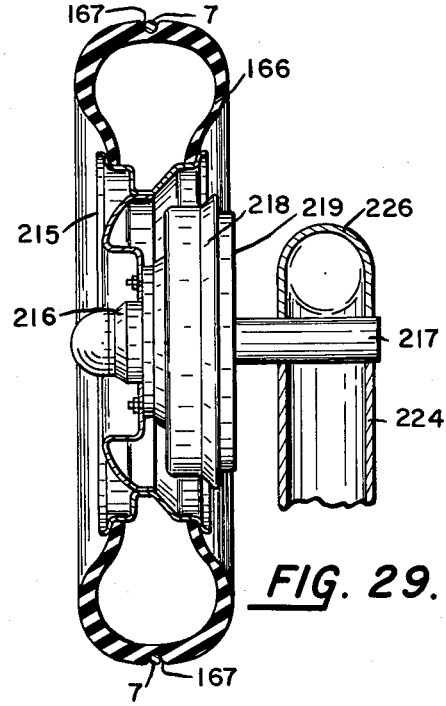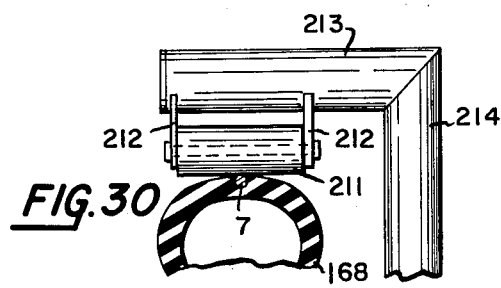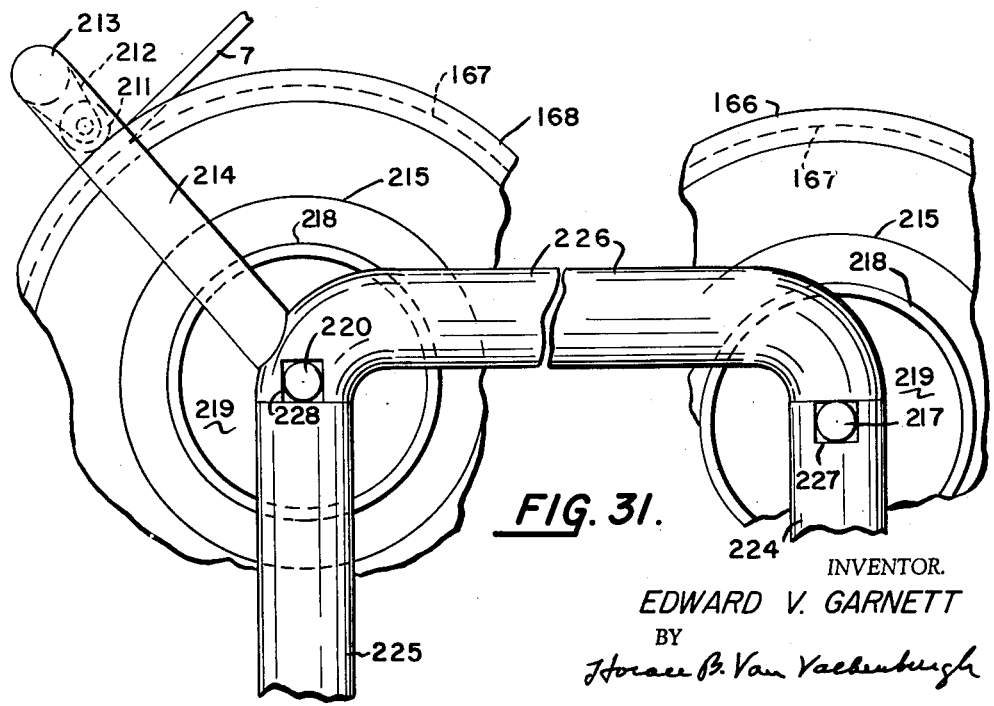

United States Patent Office 3,073,574
Patented Jan. 15, 1963

3,073,574
WIRE STRINGING EQUIPMENT
Edward V. Garnett, 3963 Walnut St., Denver, Colo.
Filed Feb. 19, 1960, Ser. No. 9,956
7 Claims. (Cl. 254—184)

This invention relates to wire stringing equipment and more particularly to wire stringing equipment used in installing electrical conductors, as on poles or towers.

For the installation of electrical conductors, such as transmission lines which are normally supported by poles or towers, a large saving in labor costs can be made by using equipment which will string or place a conductor or a number of conductors simultaneously, for a considerable distance, such as one half mile. Instead of placing one or more wires individually on position from pole to pole, or tower to tower, one or more tensioning cables or ropes can be threaded through supports on the poles or towers for a considerable distance, then each attached to an individual conductor and sufficient tension placed on the pulling rope so that the conductor will be under tension at all times while being pulled into position. Conveniently, the pulling cable is a rope of non-conductive material, such as hemp or manila, and will therefore be referred to hereinafter as a rope. Such a rope can also be used to advantage in installing conductors which are to take the place of previous conductors, while the latter remain in service, since a rope of hemp or the like will not be affected by proximity to the conductors carrying current and the new conductors, during installation, can be spaced sufficiently from the conductors carrying current that little danger of accidental contact with the conductors carrying current will exist. Sufficient tension has, of course, to be placed on the conductors being installed so that they will remain tight at all times. The tension on a number of conductors being pulled simultaneously should be substantially equal, while the tension should also be regulated so that the conductors being placed will remain tight, but the tension force will not be so great as to involve the danger of breaking a pulling rope or a conductor being placed. For higher voltages, such conductors are usually uninsulated wires, so that when replacement conductors are being installed, contact of an uninsulated wire being installed with a wire carrying current must be avoided. Copper conductors have been used for many years, but aluminum conductors are being used more and more. Since both copper and aluminum have a lower tensile strength than steel, the use of rope formed of hemp or the like has an additional advantage, in that rope may be used which has a tensile strength more nearly equal to that of the conductor, although of course of a larger size.

For installing electrical conductors over a long span and particularly a number of conductors simultaneously, two types of equipment are desirable. One type of equipment pulls in the pulling ropes, which are conveniently wound onto drums, but for a half mile length of rope, the pulling ropes should be guided onto the drums so as to be placed thereon in even layers. Since electrical conductors or wires are normally shipped and handled while on reels, it is most convenient to unwind such a conductor from the shipping reel. Thus, the other type of equipment should accommodate a plurality of reels and also produce a braking effect on each reel, so as to permit the wires to be unwound under tension. Of course, the braking effect should be as uniform as possible for all reels. Since each type of equipment is moved from place to place, or is moved to different locations, each of the above types of equipment should be mobile. Such equipment can be mounted on a truck or other vehicle, although it is more economical to mount the same on trailers which can be pulled about by a truck or other self-propelled vehicle.

In certain situations, as when only one conductor is to be replaced or strung at one time, a pulling rope can be wound in on a winch drum mounted on a truck or other vehicle, but regulated tension must be applied to the conductor as it is unwound from a reel. Thus, tensioning equipment primarily adapted to handle a single reel is of advantage in such situations. Such tensioning equipment can be mounted on a self-propelled vehicle, such as a truck, but is more conveniently mounted on a trailer which can be towed by a truck or the like, such as the truck on which the pulling winch is mounted.

Among the objects of the present invention are to provide novel wire stringing equipment, particularly adapted for use in the installation of electrical conductors or wires, on poles, towers or the like; to provide such equipment which is conveniently mounted on a trailer; to provide one form of such equipment which will handle a plurality of conductors simultaneously; to provide one type of such equipment which is used for pulling in one or more ropes to pull one or more electrical conductors or wires under tension; to provide such type of equipment in which the desired pull is produced on a plurality of ropes simultaneously; to provide such type of equipment which will cause the ropes to be pulled in and each wound onto a drum without interference between the ropes and with the ropes laid onto the drums evenly; to provide such pulling equipment which can be controlled from one point; to provide such pulling equipment which can be operated at different pulling speeds; to provide such equipment in which the pulling ropes can be readily unwound for placement of the ropes for the next installation; to provide such pulling equipment which includes safety devices to prevent unwinding in the event of a loss of power; to provide another type of equipment which can handle a plurality of reels for simultaneously unwinding conductors on the reels under tension; to provide such tensioning equipment which produces a braking effect on the reels being unwound; to provide such equipment in which the braking effect on a plurality of reels can be made substantially uniform; to provide such tensioning equipment which can be used to transport the full reels to the place of use; to provide such tensioning equipment on which the full reels may be readily loaded and empty reels unloaded; to provide an additional form of such tensioning equipment which may be used to produce tension on a single conductor; to provide such single conductor tensioning equipment on which a full reel may be readily loaded and an empty reel unloaded; and to provide each such form of equipment which is sturdy in construction and reliable in operation.

The foregoing and additional objects of this invention, together with the novel features thereof, will become apparent from the description which follows, taken in connection with the accompanying drawings, in which:

FIG. 10 is a fragmentary side elevation, on a further enlarged scale, of one end of the winding guide, with a guide channel therefor shown in section;

FIG. 11 is a front elevation, on a reduced scale, showing a support for the winding guide and the drive therefor, a central sleeve of the winding guide being shown in section but the remainder of the winding guide being omitted for clarity of illustration;

FIG. 12 is a fragmentary section, on a considerably enlarged scale, taken along line 12—12 of FIG. 11;

FIG. 13 is a condensed fragmentary top plan view, showing a portion of the frame of the pulling trailer and parts comprising a ratchet lock for one of the drums on which the rope is wound;

FIG. 14 is a fragmentary vertical section, taken along line 14—14 of FIG. 13, showing also a portion of a rope drum;

FIG. 23 is a side elevation of the tension trailer of FIG. 22;

FIG. 24 is a side elevation, on an enlarged scale, of a lifting arm for the reel shaft and forming a part of the tension trailer of FIG. 22;

FIG. 28 is a fragmentary rear view, on an enlarged scale, taken from the position of line 28—28 of FIG. 23 and showing a lower roller which holds the conductor in engagement with a first grooved, resilient annulus, such as a tractor tire;

FIG. 29 is a fragmentary vertical section, on an enlarged scale, taken along line 29—29 of FIG. 23;

Figure 22:
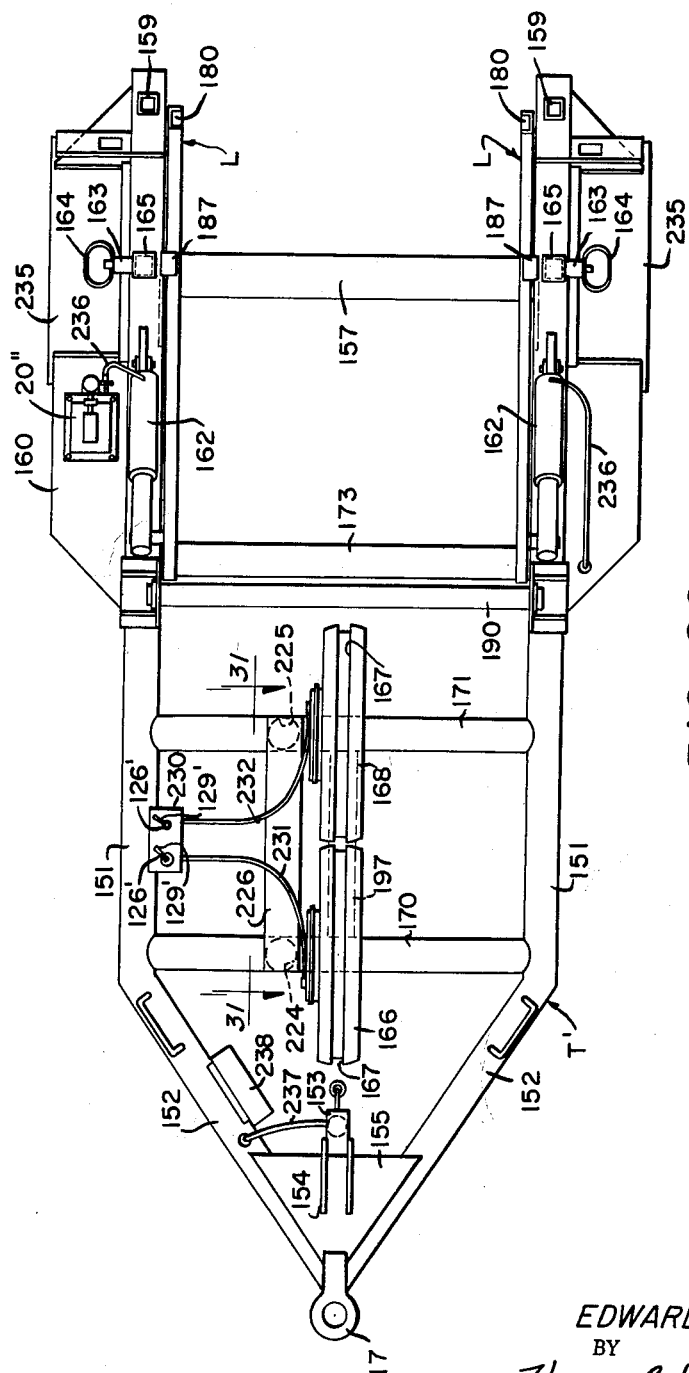
FIG. 22 is a top plan view, on an enlarged scale, of the tension trailer of FIG. 21, with the reel on which the conductor is mounted being omitted for clarity of illustration.

FIG. 30 is a fragmentary oblique section, on an enlarged scale, taken along line 30—30 of FIG. 23 and showing an upper roller which holds the conductor in engagement with a second grooved resilient annulus, such as another tractor tire; and FIG. 31 is a fragmentary, condensed side elevation, on an enlarged scale and taken from the position of line 31—31 of FIG. 22, showing particularly the supports for the two resilient grooved annuli and the upper roller.

Figure 1:
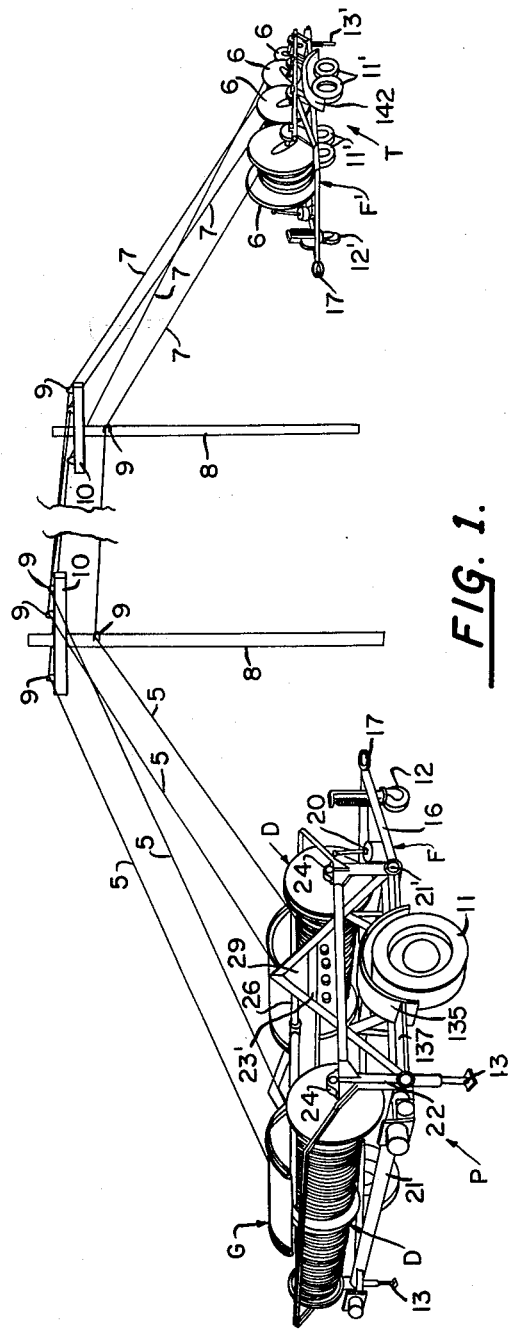
FIG. 1 is a condensed, perspective view of multiple conductors, wire stringing equipment constructed in accordance with this invention and illustrating the operation of the same, the normal distance between a pulling trailer and a tension trailer being considerably shortened for clarity of illustration.

As illustrated in FIG. 1, wire stringing equipment constructed in accordance with this invention includes a pulling trailer P, on which is mounted a pair of dual or double drums D on which ropes 5 are wound and guided onto the drums by a rope winding guide G, and a tension trailer T, on which are mounted four reels 6 from which conductors 7 are unwound under tension. Three of conductors 7 may be adapted, when installed on poles 8, to carry the three phases of three phase current, while the fourth conductor 7 may be a ground wire, as in a conventional Y circuit. Thus, three of ropes 5 followed by the respective conductors 7 are pulled through insulators 9 mounted on cross arms 10, while the fourth wire may be pulled through insulators 9 mounted on poles 8. It will be understood that, for clarity of illustration, only the first and last poles 8 are shown, since there will normally be a considerable number of poles, as over a half mile stretch. It will also be understood that the conductors may be strung on transmission towers of various types, rather than on poles, while ropes 5 may be placed in pulleys or hooks through which wires 7 are pulled and later attached to more conventional insulators. Also, the initial installation of ropes 5 can conveniently be made by starting at the tension trailer T and moving the pulling trailer P along a roadway which parallels or is adjacent poles 8 and paying out ropes 5, as over a half mile stretch, during which the ropes may be carried or pulled up each pole or tower in turn and placed in insulators 9, or the pulleys or hooks through which the ropes are to be pulled. Then, the pulling trailer P is placed in position for pulling, the ropes 5 tightened and pulling may then proceed. In general, pulling trailer P is adapted to pull in the ropes 5, such as ¾ in. manila rope, simultaneously and each drum D is adapted to accommodate a sufficient length, such as 2500 ft., of each of two ropes while the rope winding guide G moves back and forth across the trailer to cause the rope to be laid onto the drums evenly. The tension trailer T is adapted to produce a resistance to rotation of each reel 6 which is approximately equal for each of the reels and is also equal to the desired pull on ropes 5, such as about 2000 lbs. As will be described hereinafter, the drums D are rotated through a transmission which is responsive to torque and therefore will cause drums D to slow down if the pull exceeds the desired value and to speed up if the pull becomes less than the desired value. A suitable rate of speed, for 2000 lb. tension in the ropes 5 and conductors 7, is that which will cause 2500 ft. of ropes 5 to be wound onto drum D in a time period of about 60 minutes. It will be understood that other values of the tension and other rates of speed may be used.

Figure 2:
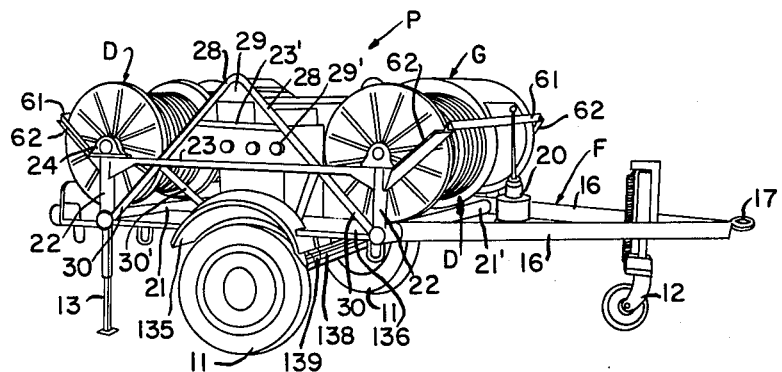
FIG. 2 is a perspective view, taken from one side and at the front of the pulling trailer of FIG. 1.

As in FIGS. 1 and 2, pulling trailer P includes a frame F, preferably of tubular construction and supported by a pair of wheels 11 mounted centrally with respect to drums D. A retractable front wheel 12 and a pair of jack legs 13 at the rear are raised during transportation and are lowered during use of the equipment for pulling, to prevent fore and aft tipping of frame F during the pulling operation. As in FIGS. 1 and 3, tension trailer T includes a frame F' on which are mounted the parts necessary to support a shaft 14 for each reel 6 and to produce a braking effect against rotation of each shaft 14, so as to produce the desired tension of the cables 7 during pulling. Frame F' is conveniently supported by a pair of dual wheels 11' at each side and positioned centrally with respect to the four reels 6, while a retractable front wheel 12' and a pair of jack legs 13' at the rear are lowered during use to prevent fore and aft tipping of frame F, but raised during transportation. Wheels 11 of pulling trailer P and wheels 11' of tension trailer T are conveniently conventional in construction, including pneumatic tires and brakes adapted to be connected to the brake control system of the vehicle used to tow the same, while the retractable front wheels 12 and 12', as well as jack legs 13 and 13', are also conveniently conventional in construction so that details of the construction need not be given, although a suitable retractable front wheel is disclosed in U.S. Patent No. 2,759,682 and suitable jack legs are disclosed in U.S. Patents Nos. 2,759,682 and 2,913,914.

Figure 4:
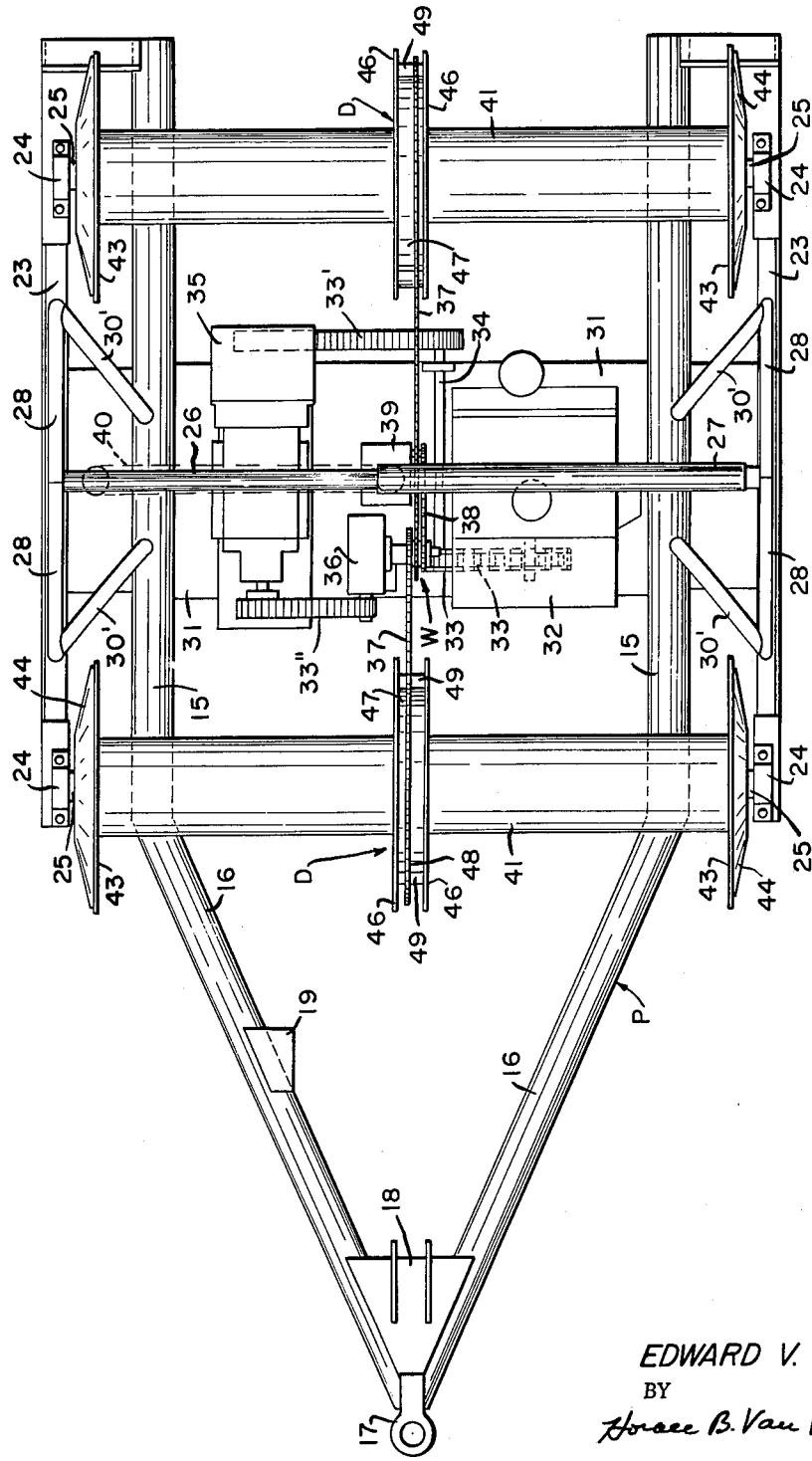
FIG. 4 is a top plan view of the pulling trailer, on an enlarged scale, with certain parts omitted for clarity of illustration.

The frame F of pulling trailer P, as in FIG. 4, includes lower side beams 15, from the front ends of which angular beams 16 converge for attachment together at the front and to a hook 17, for transportation purposes, as well as a plate 18, on which the retractable front wheel 12 of FIGS. 1 and 2 may be mounted. Also, on one of beams 16 a bracket 19 may be mounted for supporting a hand operated pump 20 of FIG. 2, by which hydraulic pressure for lowering retractable front wheel 12 may be produced. A rear lateral beam 21 and a front lateral beam 21' extend transversely between the lower side beams 15 and outwardly beyond the same, as in FIGS. 1 and 2, with a drum supporting post 22 extending upwardly from the outer end of each lateral beam 21 and 21'. The upper ends of the posts 22, on each side, may be connected by a horizontal reinforcing strut 23, while a bearing 24 for a shaft 25 of the corresponding drum D may be mounted atop each post 22. A transverse shaft 26, on which slides a sleeve 27 of the rope winding guide G is mounted below the upper ends of converging angular posts 28, the lower ends of which are mounted on the respective horizontal strut 23. Shaft 26 is mounted at each end on a triangular plate 29, as in FIG. 2, attached between the respective angle posts 28 and to a horizontal strut 23', extending between posts 28 in spaced relation to strut 23. On one side, a mounting plate 29' for suitable control devices may be attached between struts 23 and 23'. The framework may also be reinforced by struts 30 extending between the outer ends of lateral beams 21 and 21', and the underside of horizontal struts 23, as in FIG. 2, and struts 30' extending between the lower side beams 15 and horizontal struts 23, as shown also in FIG. 4. Bottom side beams 15, angular beams 16, transverse beams 21 and 21', angular posts 28 and struts 23, 23', 30 and 30' are conveniently tubular and attached together by welding, although any other suitable cross section and any other suitable manner of attachment may be used.

A platform 31, extending between lower side beams 15, is adapted to support the driving mechanism which includes an internal combustion engine 32 connected by a chain 33 with a shaft 34 which in turn drives, through a chain 33', a transmission 35, conveniently of the automatic type and including a hydraulic coupling. Through a chain 33'', the transmission 35 drives a gear reduction unit 36, conveniently of the worm gear type and on the output shaft of which may be mounted a special free wheeling sprocket assembly W. Sprocket assembly W drives drums D through chains 37 and, through a chain 38, a second gear reduction unit 39, which moves the rope winding guide G back and forth across the drums D in a manner explained later, but in general through a chain whose path is indicated as dotted lines 40 in FIG. 4 and is driven by the second gear reduction unit 39. Free wheeling sprocket assembly W enables the drive to the drums to be disconnected and permits the drums to be rotated at a relatively fast rate when paying out the ropes for another pulling operation, but still causes the rope winding guide G to move back and forth across the drums, so that the ropes will unwind evenly and thus be guided during unwinding as well as during winding. As will be evident, since the automatic transmission 35 preferably includes a fluid drive connection, during winding of the ropes onto the drums, the pull on the ropes at the pulling trailer P will equal the tension on the wires produced at the tension trailer T. Thus, the automatic transmission will slow down if the tension exceeds the resistance produced at the tension trailer and will speed up if the tension in the ropes is less than that being produced at the tension trailer. Thus, all slack in the ropes and conductors will be pulled out at all times and the conductors will be pulled along the desired path under the tension produced at the tension trailer.

Figure 5:
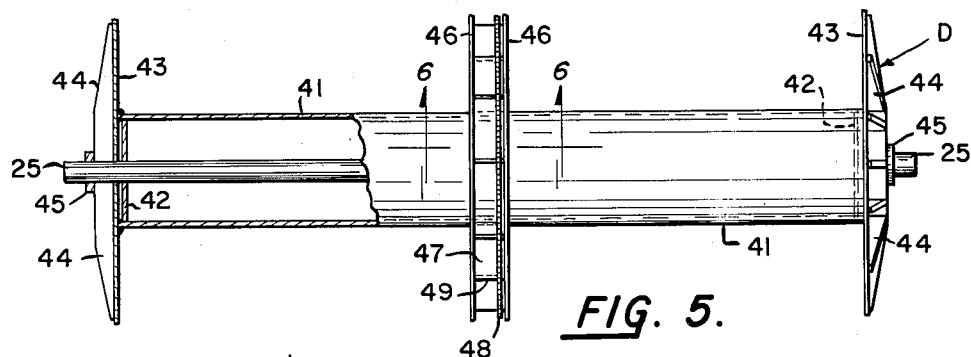
FIG. 5 is a front elevation, on a further enlarged scale and partly in longitudinal section, of a double rope drum forming a part of the pulling trailer.
Figure 6:
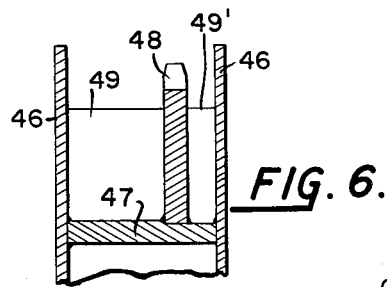
FIG. 6 is a fragmentary section, on an enlarged scale, taken along line 6—6 of FIG. 5.

As in FIGS. 4 and 5, each drum D comprises an elongated cylinder 41, surrounding shaft 25, the shaft being centered in the drum by rings 42, which are conveniently welded to the inside of cylinder 41 adjacent the ends thereof and to shaft 25. An annular end plate 43, through which shaft 25 extends, may be welded to each end of cylinder 41, with each end plate 43 being reinforced by a series of radially extending struts 44, each conveniently having the form shown and welded along one edge to end plate 43 and along an inner portion of the opposite edge to a reinforcing ring 45, which surrounds shaft 25. In order to divide each drum D into two rope receiving spaces, as well as to provide means whereby the drum may be rotated and also means for cooperating with the ratchet mechanism described later, a pair of spaced annular plates 46 are attached centrally to cylinder 41, as by welding, while a ring 47 is attached between plates 46, as in FIG. 6. Ring 47 supports a sprocket 48 which may be attached thereto, as by welding, with sprocket 48 being reinforced by a series of wider ribs 49 and narrower ribs 49', attached to sprocket 48 and to the inside of the respective plates 46, as by welding. By placing sprockets 48 closer to one plate 46 on one of drums D and placing sprocket 48 closer to the opposite plate 46 on the opposite drum D, the chains 37 of FIG. 4 may drive the two drums simultaneously from adjacent sprockets, as on the sprocket assembly W of FIG. 4. In addition, the ribs 49 provide points of engagement for a latch mechanism adapted to prevent reverse rotation of the drums, as described later.

Figure 7:
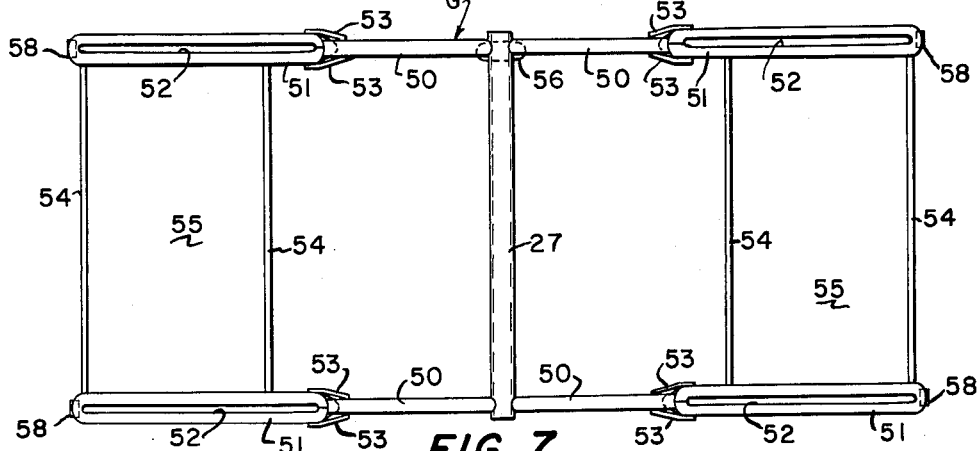
FIG. 7 is a top plan view, on an enlarged scale, of a rope winding guide or device for guiding the ropes onto the drums of the pulling trailer.
Figure 8:
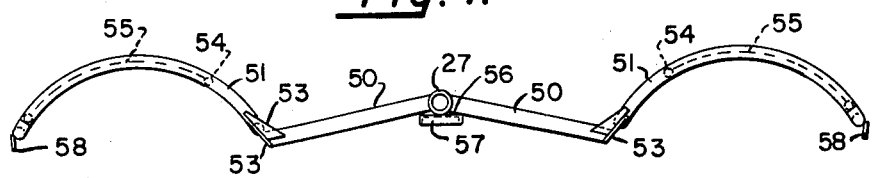
FIG. 8 is a side elevation of the rope winding guide of FIG. 7.

As indicated above, the rope winding guide G includes sleeve 27 which is movable on shaft 26 of FIG. 4, while a pair of supports 50, as in FIGS. 7 and 8, extend in generally opposite directions from points adjacent the opposite ends of sleeve 27, supports 50 conveniently being inclined slightly downwardly, as in FIG. 8. A generally arcuate guide 51, provided with a slot 52 in the center, is attached to the outer end of each support 50, the connection therebetween being conveniently reinforced by gussets 53. Each slotted guide 51 may be formed from a tube or pipe cut to length, then bent to shape to form slot 52 and also to be arcuate, when viewed from the side, to correspond to an arc with shaft 25 of the corresponding drum D as a center. For reinforcing purposes, a pair of rods 54 may extend between each pair of guides 52 on each side with rods 54 conveniently being tubular, while arcuate plates 55 also extend between the corresponding guides 52 and may be attached to the inside of each guide 52 and also to the corresponding rods 54, as by welding. At one end of sleeve 27 and conveniently beneath the oppositely extending supports 50 at that end, a generally oval plate 56, provided with a depending rim 57, for driving the winding guide G back and forth, is attached to the underside of sleeve 27 and supports 50. Also, at each outer end of each guide 51, a plate 58 may be attached in vertical position, as by welding, for mounting a roller 59 of FIG. 10, which surrounds a roller bearing mounted on a pin 60 attached to plate 58. Each roller 59 engages a channel 61 which, as in FIG. 4, extends beneath a pair of mounting brackets 62, which in turn extend upwardly and also respectively forwardly and rearwardly from posts 22. As will be evident, as rope winding guide G reciprocates, the front and rear ends thereof will be prevented from tipping by the engagement of rollers 59 with the guide channels 61.

Figure 9:
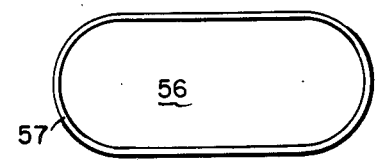
FIG. 9 is a bottom plan view, on a further enlarged scale, of a stud or roller receiver for driving the rope winding guide.

As illustrated in FIG. 11, each opposite end of shaft 26, along which sleeve 27 of winding guide G reciprocates, extends into a cap 63 attached to plate 29. As indicated before, the rope winding guide G is driven from the second gear reduction unit 39, the output shaft 64 of which, as in FIG. 11, extends upwardly beneath the shaft 26 and is provided with a sprocket engaging a chain 65, the path of chain 65 being indicated by dotted lines 40 in FIG. 4 for clarity of illustration. Chain 65 also extends around a sprocket mounted on an upright shaft 66, in turn mounted on a bracket 67 attached to plate 29 and strut 23' or mounted in any other suitable manner. Attached to the outside of chain 65, to prevent interference with the passage of the chain around the sprockets, is an angular drive bracket 68 having flanges 69, as in FIG. 12, attached to chain 65 by a special pin 70. A roller 71, conveniently the outer race of a ball bearing mounted on an upright stud 72, mounted above the chain on the upper flange of bracket 68, engages the inside of rim 57, which conveniently has the form shown in FIG. 9 and the longer axis of which extends transversely of sleeve 27, as in FIG. 7, to accommodate lateral displacement of guide bracket 68 and roller 71 during movement of chain 66 about the sprockets. When moving sleeve 27 and consequently the rope winding guide G in one direction, roller 71 is disposed adjacent one end rim 57 but is disposed adjacent the opposite end of rim 57 on the return path. As will be evident, with the drive bracket 68 moving toward the right in FIG. 11, sleeve 27 and consequently rope winding guide G will be moved toward the right, until drive bracket 68 passes around the sprocket mounted on shaft 66, at which time the right end of sleeve 27 will approach the right end of shaft 26. Also, as drive bracket 68 passes around the sprocket on shaft 66, roller 71 will shift toward the opposite end of rim 57, and while drive bracket 68 moves from the sprocket on shaft 66 to the sprocket on shaft 64, the sleeve 27 will be moved toward the left. As drive bracket 69 passes around the sprocket on shaft 64, the left end of sleeve 27 will approach the left end of shaft 26 and roller 71 will then move toward the first end of rim 57, as in the position of FIG. 12. Thus, sleeve 27 will be moved back and forth along shaft 26 at a substantially uniform rate, so that as drums D rotate, the rope will be laid down in succeeding, adjacent windings about the drums. Since extreme accuracy is not necessary, the relative speed of movement of chain 65 may be chosen in proportion to the rate of rotation of drums D, so that the movement of the winding guide G along the drums will be proportional to the peripheral speed at a radius corresponding to the radially central layers of rope. Thus, for the layers of rope inwardly of such radially central layer, the rope windings in these layers will be slightly further apart than in the radially central layer, while for rope layers outwardly from the radially central layer, the rope windings will be compressed together, but there is normally sufficient accommodation in the ropes for the same.

In order to prevent unwinding of the ropes from drums D while the ropes and wires are under tension, due to loss of power through accidental stoppage of engine 31 of FIG. 4, for instance, a ratchet mechanism may be provided, such as in the manner illustrated in FIGS. 13 and 14. Since the drums are connected together through chains 37 and the sprockets therefor, one such ratchet mechanism might suffice, but a separate ratchet mechanism for each of the drums is preferably provided. Thus, a similar ratchet mechanism is preferably provided for each of drums D, with the ratchet mechanism for the rear drum being similar to that for the front drum shown in FIGS. 13 and 14. Such a ratchet mechanism may comprise a ratchet lever 73 mounted on a rod 74 which extends alongside the lower transverse beam 21 and beneath the curb side, lower side beam 15, to a handle 75 adjacent the end of the transverse beam 21. Rod 74 is pivotally mounted in bracket arms 76 and 76', disposed on each side of lever 73 and attached to the underside of transverse beam 21, while rod 74 is also pivotal in a bracket arm 76", attached to the underside of transverse beam 21 and conveniently extending upwardly to the outer edge of side beam 15, as in FIG. 13. When handle 75 is pushed downwardly, the ratchet lever 73 will be raised to the full position of FIG. 14, being held in that position by a tension spring 77 connected between an ear 78, extending laterally from bracket 76 but below the center of rod 74, and a plate 79, attached to ratchet lever 73 and extending laterally therefrom. The outer end of ratchet lever 73 is preferably rounded so that, as shown in FIG. 14, when the drum rotates during winding, in the direction of the solid arrow of FIG. 14, each rib 49 will engage the ratchet lever 73 in turn, but will pass over the end of the ratchet lever, due to the pivoting action permitted by spring 77. However, if the drum should rotate in the reverse direction, indicated by the dotted arrow of FIG. 14, the spring 77 will pull ratchet lever 73 toward beam 21 and the end of ratchet lever 73 will engage the pocket formed between the next rib 49 and ring 47 of the drum, so that upon further reverse rotation of the drum, the end of ratchet lever 73 will wedge into this pocket and stop the drum from rotating, as indicated by the upper dotted position of ratchet lever 73 in FIG. 14.

To render lever 73 inoperative, when the rope is being unwound from the drums for another wire stringing operation, handle 75 may be moved upwardly to move the ratchet lever 73 to the lower dotted position of FIG. 14, in which position a tail or extension 73' of lever 73 will engage the underside of beam 21 and the centerline of spring 77 will move below the center of rod 74, due to the movement of plate 79 to the lower dotted position of FIG. 14. Thus, spring 77 will hold ratchet lever 73 in the lower dotted position of FIG. 14 until again shifted to the full position of FIG. 14 by appropriate movement of handle 75.

Figure 15:
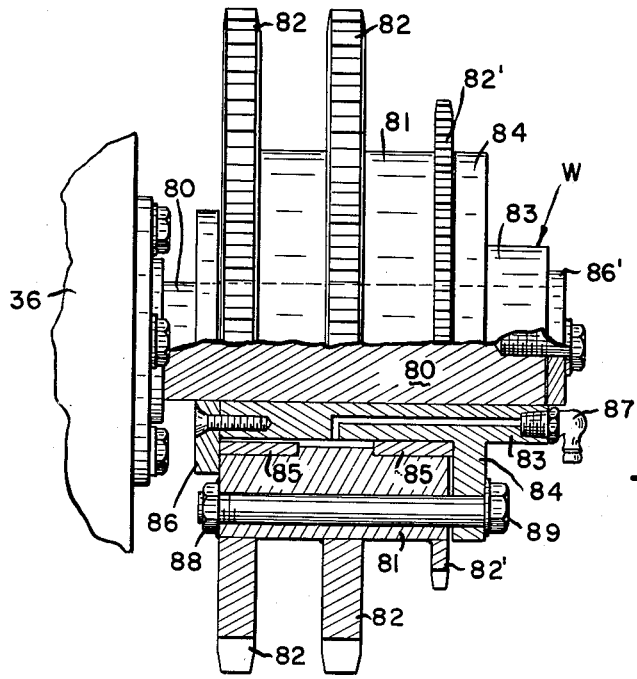
FIG. 15 is a side elevation, on an enlarged scale and in half section, of a free wheeling sprocket assembly, showing also a portion of the speed reduction unit on which the assembly is mounted.

In order to permit free unwinding of the ropes from the drums, when the ropes are being laid out preparatory to installing another set of conductors, the engine and drive mechanism of the pulling trailer may conveniently be disconnected from the drums through the free wheeling sprocket W, which may be constructed as shown in FIG. 15. The free wheeling sprocket W is mounted on an output shaft 80 of gear reduction unit 36, as indicated previously, and may comprise a ring 81 to which is attached, as by welding, a pair of sprockets 82 for engagement with chains 37 of FIG. 4, which drive the drums, and a smaller sprocket 82', engaged by chain 38 which drives the second reduction gear unit 39 of FIG. 4. A sleeve 83 having a flange 84 adjacent one end is mounted on shaft 80 for rotation with the shaft, as by a key, while a pair of bushings 85 are interposed between sleeve 83 and ring 81, the inner edge of each bushing conveniently abutting a shoulder formed for that purpose on the inside of ring 80. One bushing 85 is further held in position by flange 84 of sleeve 83 at one side and the other bushing by a flange ring 86, conveniently connected to sleeve 83 by cap screws, as shown. Sleeve 83 may further be secured to shaft 80 by a flange ring 86, connected to the end of shaft 80 by a cap screw, as shown, while lubrication of bushings 85 may be affected through a grease fitting 87 installed on sleeve 83 with appropriate passages leading to the location of the bushings. A series of nuts 88, such as three in number, are welded to ring 81 at spaced circumferential positions, coinciding with the positions of three holes through sleeve 81 through which normally extend bolts 89, which also extend through corresponding holes in flange 84 of sleeve 83 in order to lock sleeve 83 to ring 81. Whenever free wheeling of drums D is desired, it is necessary only to remove the three bolts 89, so that ring 81 may rotate freely about sleeve 83 with bushings 85 acting as sleeve bearings. In this construction of the free wheeling sprocket W, it will be noted that drums D are still connected together through chains 37 and sprockets 82 while the drums are also connected with the rope winding guide G through chain 38 and sprocket 82'. Thus, as the drums are rotated while the ropes are unwound at a faster rate than that accommodated by the engine of the pulling trailer, the rope winding guide G will still be moved back and forth across the drums to cause the ropes to unwind evenly.

Figure 3:
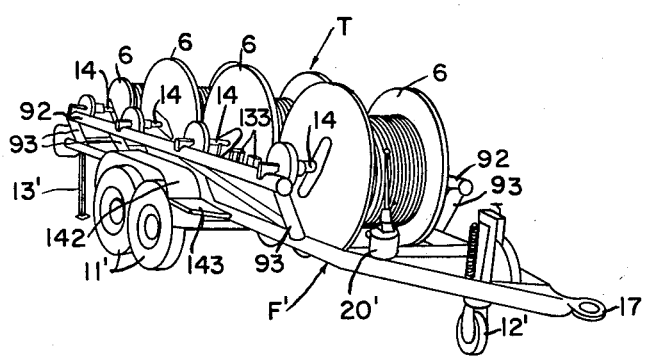
FIG. 3 is a perspective view, taken from one side and at the front of the tension trailer of FIG. 1.
Figure 17:
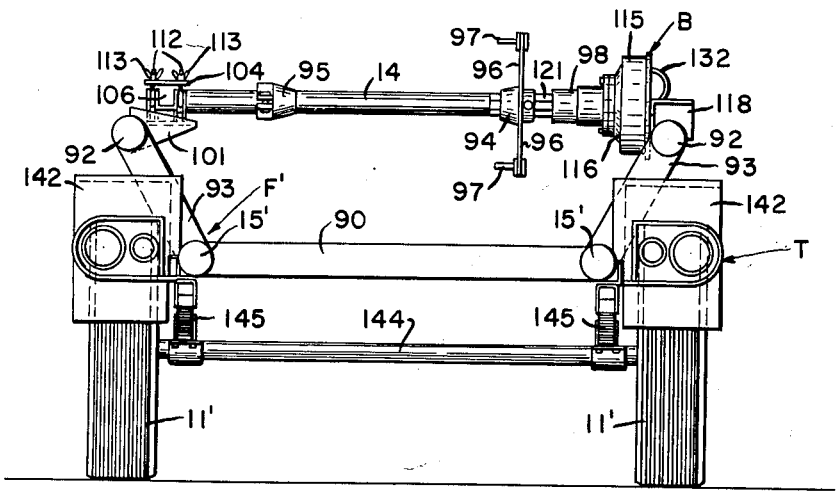
FIG. 17 is a rear elevation of the tension trailer of FIG. 16.
Figure 16:
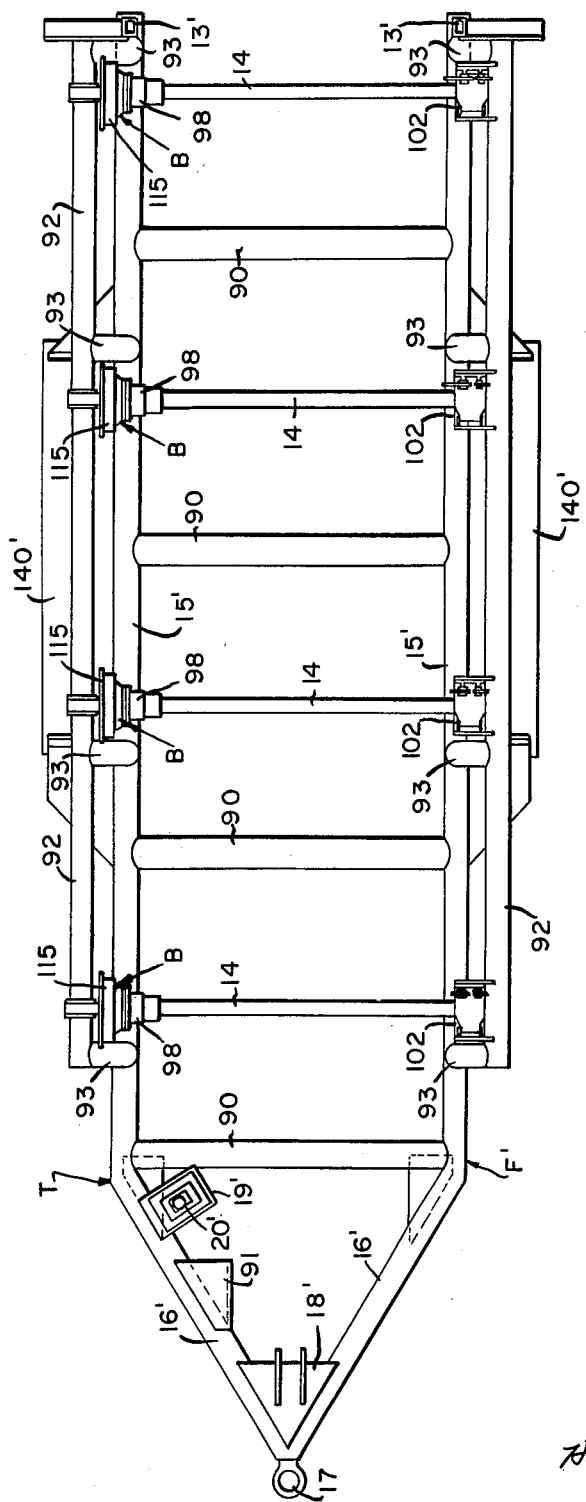
FIG. 16 is a top plan view, on an enlarged scale, of the tension trailer of FIG. 3, with the reels on which the conductors are mounted being omitted for clarity of illustration.
Figure 18:
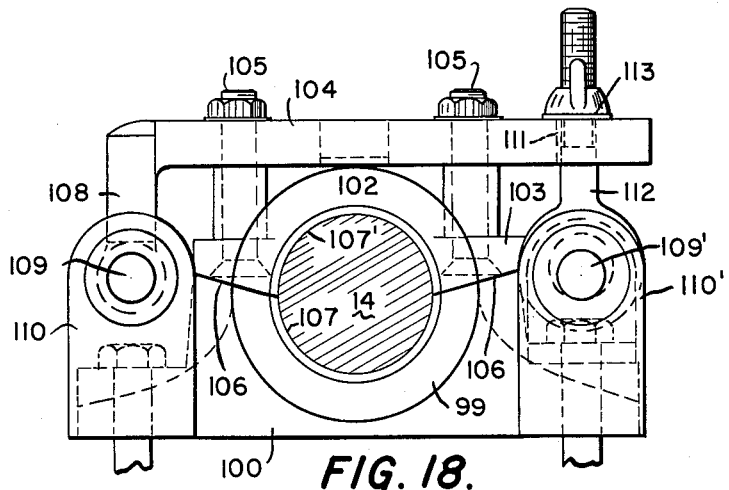
FIG. 18 is an end view, on an enlarged scale, of a bearing and associated parts provided for one end of each of the shafts on which the reels are mounted in the tension trailer.

As in FIGS. 16 and 17, the frame F' of the tension trailer T may include side beams 15', between which cross beams 90 extend, with angle beams 16' extending forwardly in converging relation from the front end of the respective side beam 15', the angle beams 16' being connected together at the front end, a hook 17 being attached thereto for towing purposes. A plate 18', for mounting the front retractable leg 12' of FIG. 3, may be attached to the angle beams 16', while a bracket 19' may be attached to the curb side angle beam 16' to support a hand pump 20', for supplying hydraulic pressure to the retractable front leg 12' of FIG. 3. A bracket 91 may also be attached to the curb side angle beam 16' for mounting a hand operated parking brake for wheels 11' of FIGS. 3 and 17. The reel shafts 14, with the reels 6 mounted thereon as in FIG. 3, are supported by upper side beams 92, while struts 93 extend upwardly and outwardly from the lower side beams 15' to the upper side beams 92. The position of the supports for the reel shafts 14 are preferably interposed with the positions of the cross beams 90, so that the reels may extend downwardly between the cross beams. Each of lower side beams 15', upper side beams 92, cross beams 90, angle beams 16' and struts 93 are conveniently tubular and connected together by welding. Each reel shaft 14, as in FIG. 17, may be provided with a conical sleeve 94 for engaging the hole in one side of the reel drum and an adjustable, conical sleeve 95 for engaging the hole in the opposite side of the reel drum, while sleeve 94 may be provided with a pair of laterally extending arms 96, each provided with an axially extending pin 97 for engaging appropriate holes in the reel drum to mechanically connect the shaft 14 with the corresponding reel drum so that the braking effect produced by a braking device B will be transmitted in a positive manner to the reel. One end of each reel shaft 14 is inserted in a sleeve 98 of the braking device B and the opposite end is supported by a split bearing, the lower half 99 of which is mounted in a block 100 of FIG. 18, which is attached, as by bolts, to a bracket 101 mounted on the corresponding upper side beam 92, as in FIG. 17. The upper half 102 of the split bearing, as in FIG. 18, is mounted in a block 103 attached to a lever 104 by bolts 105, with the intersecting faces 106, between the blocks 100 and 103 and the bearings 99 and 102, preferably extending angularly and downwardly toward the center at each side to insure alignment of the upper and lower bearing halves when the lever 104 is moved to closed position. Also, each half 99 and 102 of the split bearing may be provided with a bushing 107 and 107', respectively. Link 104 is provided with a right angle arm 108 pivoted on a pin 109, mounted between ears 110 extending upwardly in spaced relation from block 100, the opposite end of lever 104 being provided with a pair of slots 111 adapted to receive a pair of bolts 112. Each bolt 112 has an eye at one end, so as to be pivotal about a pin 109' extending between ears 110', which extend upwardly in spaced relation from block 100, while the opposite end of each bolt 112 is threaded to receive a wing nut 113. As will be evident, when wing nuts 113 are loosened, bolts 112 may be moved out of slots 111, then lever 104 swung upwardly and to the left, as viewed in FIG. 18, so as to separate the two halves of the split bearing and permit the removal of the reel shaft 14 having an exhausted reel thereon, after which the reel shaft 14 may be removed from the empty reel and placed in a full reel. Then, the full reel may be hoisted in position, with one end being slipped into sleeve 98 of braking device B and the opposite end lowered into the lower half 99 of the split bearing. Then, the lever 104 may be swung to closed position, the bolts 112 swung upwardly into place and the wing nuts 113 tightened.

Figure 19:
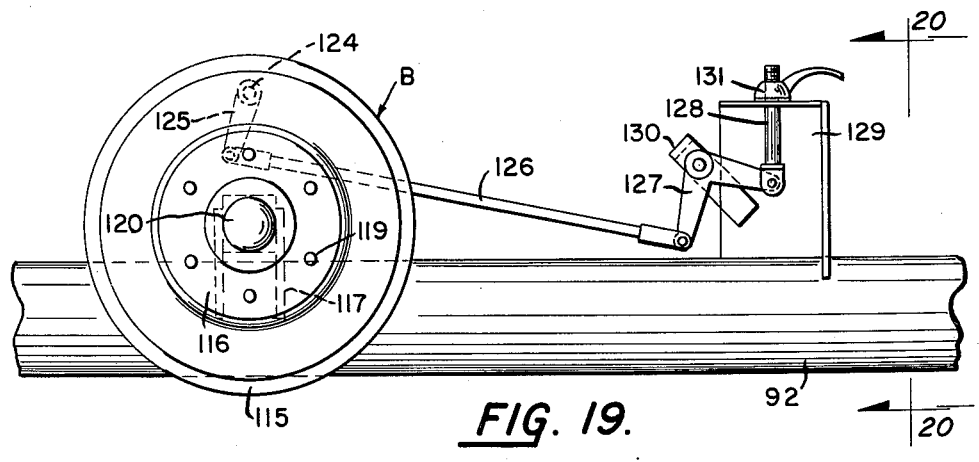
FIG. 19 is a side elevation, on an enlarged scale, of a braking device provided for the opposite end of each of the reel shafts.
Figure 20:
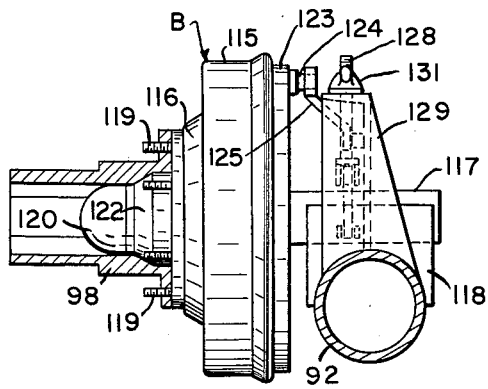
FIG. 20 is an end elevation of the braking device of FIG. 19, taken from the position of line 20—20 of FIG. 19.

As in FIGS. 19 and 20, each braking device B includes a brake drum 115 mounted on a hub 116, in turn mounted for rotation, as by roller bearings, on a stub shaft 117 which is fixed and is mounted on a bracket 118 attached to the corresponding upper side beam 92, as by welding. Hub 116 is provided with a plurality of axially extending studs 119 for attachment of sleeve 98 and conveniently also with a rounded inner hub 120 to facilitate centering of sleeve 98, the interior of which is non-circular, such as hexagonal, to provide a mechanical connection with end 121 of reel shaft 14, which corresponds in shape thereto. The sleeve 98 is also provided with an inner flange having holes through which studs 119 extend and a conical surface on the inside, adapted to engage a corresponding conical surface 122 of hub 116, just inwardly of abutment 120. A brake backing plate 123 is also mounted on stub shaft 117 and carries a brake band assembly which is conventional and therefore not shown, the brake band assembly being controlled by a pivot rod 124 provided with an angularly extending arm 125, the outer end of which is pivotally connected to a linkage rod 126. The opposite end of rod 126 is pivotally connected to one arm of a forked link 127, the opposite arm of which is pivotally connected to an adjusting bolt 128 which extends through a hole in a top flange of a bracket 129, also mounted on the corresponding upper side beam 92, while forked link 127 is pivoted centrally on an auxiliary bracket 130, conveniently attached to bracket 129. A greater or lesser braking effect of the brake band assembly within brake drum 115 is produced by turning a handle nut 131, which engages the threaded end of bolt 128. As will be evident from FIG. 19, tightening nut 131 against the upper flange of bracket 129 will cause forked lever 127 to pivot counterclockwise, as viewed in FIG. 19, thereby to pull rod 126 and arm 125 to the right and push the brake bands of the brake band assembly against the inside of drum 115. Similarly, loosening nut 125 will cause the brake band assembly to produce a lesser braking effect. In order to simplify the connection between the forked link 127 and the brake band assembly, a flexible wire cable 132 of FIG. 17 may be substituted for the offset arm 125 and rod 26. This permits the forked link 127 and adjusting nut to be installed at a more convenient position, such as on a bracket 133 mounted on the inside of upper side rail 92, as in FIG. 3. Wire cable 132 comprises a conventional flexible push-pull cable, i.e., a central wire surrounded by a hollow flexible cable having conventional convolutions. The braking device of FIGS. 19 and 20 is mechanical and thus the braking effect against the rotation of each reel being unwound must be adjusted manually, but this can be done readily.

The pulling trailer P may be provided with fenders 135, disposed above the wheels as in FIGS. 1 and 2, and also with running boards 136 and 137, extending forwardly and rearwardly, respectively, from the respective fenders. Also, the axle 138 of FIG. 2, which extends between wheels 11, may be connected by leaf springs 139 to the underside of the lower side beams 15 of FIG. 4. The tension trailer T, as in FIGS. 3 and 17, may be provided with a fender 142, over each set of dual wheels at each side, and also with a running board 143, extending forwardly from each fender 142, as in FIG. 3. As in FIG. 17, an axle 144 extends between each pair of wheels on opposite sides of the tension trailer T, while the axles 144 may be mounted on leaf springs 145 attached to the underside of the lower side beams 15'.

Figure 21:
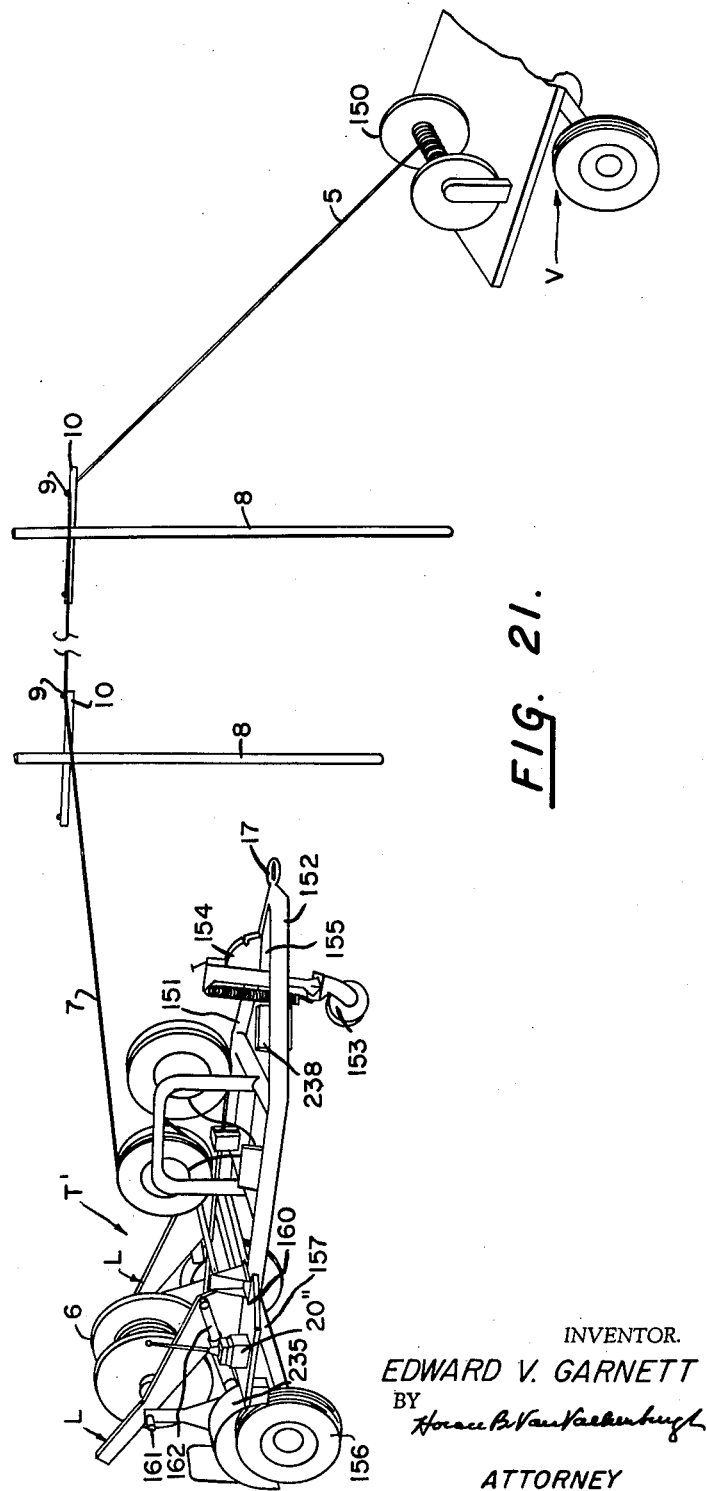
FIG. 21 is a condensed, perspective view of single conductor tensioning equipment constructed in accordance with this invention and illustrating the operation of the same, the distance between a tension trailer and a vehicle on which a pulling winch is mounted being shortened for clarity of illustration.

For pulling a single conductor, an alternative tension trailer T' of FIG. 21 may be used in conjunction with a vehicle V, on which is mounted a winch 150 for pulling in a rope 5, connected to a single conductor 7 which is unwound from a reel 6 mounted on pulling trailer P'. As before, rope 5 pulls conductor 7 through insulators or pulleys 9 mounted on cross arms 10 of poles 8, it being noted that there will normally be a considerably greater number of poles 8 than shown, particularly when rope 5 is a convenient length, such as 2500 feet, to enable a half mile of conductor to be pulled into position. The winch 150 is conveniently driven at about constant speed, with the tension on conductor 7 being regulated at tension trailer T'. Tension trailer T', as in FIGS. 21 and 22, conveniently includes a frame having side beams 151, from the front ends of which angular beams 152 converge forwardly for connection together at the front, with a hook 17 for pulling purposes also being connected to the front ends thereof. A retractable front wheel 153 is mounted on a support 154, in turn mounted on a platform 155 extending between the front ends of angular beams 152. Rear wheels 156 are mounted on an axle 157, which is connected to the underside of side beams 151 by springs 158 of FIG. 23. Also, jack legs 159 may be connected to the rear ends of side beams 151, the jack legs 159 being retracted during transportation but extended into engagement with the ground during stringing of the conductor. A platform 160 is attached to one of the side beams 151, just forwardly of one of wheels 156, to support a hand operated pump 20" of FIG. 21, by which hydraulic fluid pressure is produced, for movement of the front wheel 153 and a pair of lifting arms L for a reel shaft 161. The lifting arms L are elevated and also lowered by hydraulic cylinders 162 of FIGS. 22 and 23, while lifting arms L may be secured in an upper position by pins 163, provided with handles 164 and mounted at the upper ends of posts 165, which extend upwardly from the respective side beams 151. From reel 6, the conductor 7 passes through a series of guide rollers, which will be described later, then in a "figure 8" relation around a front or first resilient annulus 166 having a central, circumferential groove 167 therein and thence around a rear or second resilient annulus 168, also having a central, circumferential groove 167 therein, with the conductor extending around the annulus 166 and 168 within each groove 167. A conventional tractor tire, having a groove similar to groove 167 therein, is conveniently used for each of the front and rear annuli 166 and 168. Each annulus 166 and 168 is provided with a brake, as will be hereinafter decribed, and the resilient annuli, each of which is in extended engagement with the conductor 7 and preferably in excess of 180°, insure that the resistance to rotation produced by the brakes will result in a corresponding tension on conductor 7 as it leaves the tension trailer.

Spaced cross beams 170 and 171, on which the annulus 166 and annulus 168 are mounted, as described later, extend transversely between side beams 151, with cross beam 170 being disposed adjacent the front ends of side beams 151 and the cross beam 171 being spaced rearwardly therefrom. A shaft 172, shown in dotted lines in FIG. 23 and also shown in FIG. 24, which is conveniently tubular, also extends between side beams 151 at the front ends of lifting arms L and provides a pivot for a sleeve 173, to the opposite ends of which the respective lifting arms L are attached. Each lifting arm L may be similar to the lifting arms of the hydraulic cable reel trailer of U.S. Patent No. 2,913,914, and thus include, as in FIG. 24, a triangular box 174, conveniently formed of triangular plates having side flanges and welded together, is attached at one acute corner to sleeve 173, while a channel 175 extends from the opposite acute corner. The outer end of channel 175 is conveniently closed by a plate 176 and a position spaced from the inner end closed by a plate 177, while a lower flange plate 178 extends along the lower front of channel 175, between plates 176 and 177, and an upper flange plate 179 extends along the upper edge of channel 175, between inner plate 177 and a point spaced from outer plate 176. The upper flange of channel 175 is also cut back to form an entrance slot 180 for the end of reel shaft 161, which is conveniently provided with a groove having an inner diameter corresponding to the space between flanges 178 and 179. As will be evident, when such a reel shaft is inserted in slots 180 at the ends of channels 175, the aforesaid groove will fit between flanges 178 and 179. As will be evident from FIGS. 22 and 23, with reel 6 positioned on the ground rearwardly of trailer T', the lever arms L may be raised until each slot 180 engages the corresponding end of the reel shaft and the reel shaft and reel then lifted by arms L, outer plate 176 preventing the reel shaft from falling rearwardly out of the lifting arms. As soon as lifting arms L are raised slightly above a horizontal position, the reel shaft will roll down channels 175 until the end of the reel shaft engages a stop 181 adjacent plate 176 and disposed between the web of channel 175 and flange plates 178 and 179. As in FIG. 24, each side of box 174 is provided with a hole 182, at the upper corner of the triangle, in which a pin 183 of FIG. 23 is secured, as by welding, for pivotal attachment of hydraulic cylinder 162, the opposite end of which is pivotally connected to a bracket 184, mounted on the corresponding side beam 151. For engagement with the corresponding pin 163, a hole 185 is provided in the web of channel 175, while hole 185 may be reinforced by a strip 186 attached to the outside of the web of channel 175 and then extending upwardly and inwardly above the top of channel 175, then directly downwardly to the upper edge of flange plate 179, to form an inclined guide 187 for the inner end of locking pin 163.

Figure 25:
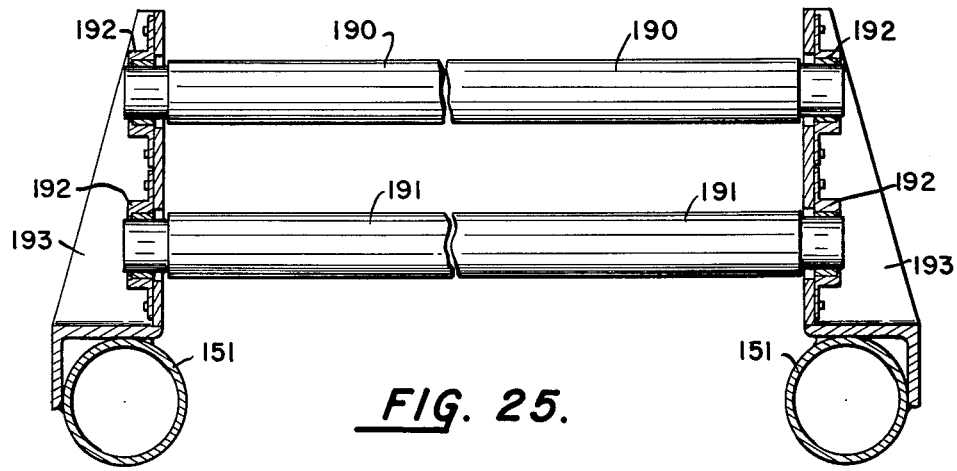
FIG. 25 is a condensed vertical section, on an enlarged scale, taken along line 25—25 of FIG. 23 and showing particularly a pair of horizontal guide rollers for the conductor.
Figures 26, 27:
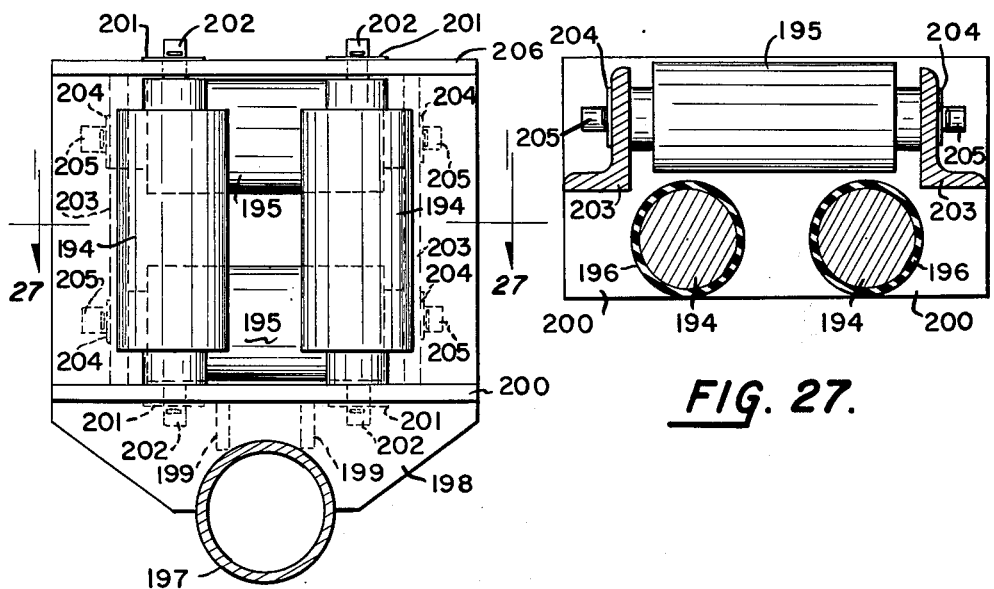
FIG. 26 is a fragmentary vertical section, on an enlarged scale, taken along line 26—26 of FIG. 23 and showing particularly a pair of vertical guide rollers and an associated pair of horizontal rollers for the conductor.
FIG. 27 is a horizontal section, taken along line 27—27 of FIG. 26.

As the conductor 7 is unwound from the bottom of reel 6, as in FIGS. 21 and 23, it passes between a pair of horizontal rolls 190 and 191, which are vertically spaced and extend the width of side beams 151, as in FIG. 25, being mounted in bearing 192 mounted on brackets 193, in turn mounted on side beams 151. The rollers 190 and 191 permit the connector 7 to move from side to side as it is unwound from the reel 6, but restrain upward or downward movement of the conductor, as it unwinds, to an area corresponding to a plane extending forwardly to the underside of the front resilient annulus 166. After passing beneath rear annulus 168 and also moving from side to side in accordance with the position on reel 6 from which it is unwound, as in FIG. 23, the conductor 7 then passes between a pair of laterally spaced, vertical rolls 194 and an associated pair of vertically spaced, horizontal rolls 195, the centers of which are aligned with the bottom of groove 167 in resilient annulus 166. As will be evident, rolls 194 and 195 guide conductor 7 for engagement with groove 167 in the annulus 166. Vertical rolls 194, as in FIG. 27, are preferably provided with a covering layer 196 of rubber or the like, while horizontal rolls 195 and also rollers 190 and 191 are preferably provided with a similar covering layer to prevent damage to conductor 7. To support rolls 194 and 195 for rotation, a longitudinal beam 197, shown in dotted lines in FIG. 22, extends between cross beams 170 and 171, while a bracket plate 198 extends upwardly from beam 197, as in FIG. 26, and is attached thereto in a suitable manner, as by welding. Bracket plate 198 extends transversely of beam 197, while a pair of longitudinal bracket plates 199 may also be welded to the top of beam 197, at positions spaced from each side of the center, with the bracket plates 198 and 199 supporting a lower platform 200, on which is mounted lower bearings 201 for shafts 202 of vertical rolls 194. A pair of uprights 203, conveniently angles as in FIG. 27, are mounted on platform 200 and support bearings 204 for shafts 205 of rolls 195 and also support a top plate 206, as in FIG. 26, on which are mounted upper bearings 201' for shafts 202 of rolls 194.

As will be evident, the conductor 7 is aligned generally with groove 167 in annulus 166, at a position generally tangent to the lower point of the circumference thereof, while conductor 7 is also held in engagement with annulus 166 and particularly groove 167 therein, by a roller 207, as in FIG. 23, which may be provided with a covering of rubber or other resilient material to prevent damage to the conductor. As in FIG. 28, roller 207 is mounted on a shaft 208 received in bearings 209 mounted on bracket plates 210, in turn extending upwardly from cross beam 170 and attached thereto in a suitable manner, as by welding. As described previously and also shown in FIG. 23, conductor 7 extends in a "figure 8" relationship about the resilient annuli 166 an 167, thus extending from the point of engagement at which roller 207 presses against the lower point of the circumference of annulus 167, around annulus 166 for greater than 180°, such as almost 270°, to the point of approach to the annulus 168, then into groove 167 in annulus 168 and around annulus 168 for greater than 180°, such as about 220°, to a point on the upper rear edge thereof. At the latter position, a roller 211 is mounted for engagement with the annulus 168 to maintain conductor 7 in groove 167 until the conductor leaves the annulus. Depending upon the position of tension trailer T' with respect to the first pole 8 and the height of the first insulator or pulley through which the conductor passes, the angle at which conductor 7 leaves the periphery of annulus 168 may vary somewhat, although it is generally as shown in FIG. 23. The upper roller 211, as in FIGS. 23 and 30, is mounted for rotation between brackets 212 extending downwardly at an angle from a horizontal arm 213, attached to the upper end of a post 214 which extends upwardly in angular relation, such as 45° to the horizontal, from a support for the annuli or tires 166 and 168, arm 213 and post 214 being conveniently tubular.

The front annulus or tire 166, as in FIG. 29, may be mounted on a conventional wheel 215 provided with a rim for the tire, and attached, as by bolts, to a hub 216 mounted for rotation on a fixed spindle 217. Hub 216 is also provided with a brake drum 218, while a brake backing plate 219 is mounted on spindle 217, a conventional mechanical brake arrangement being mounted on brake backing plate 219 within drum 218. As in FIG. 31, the the rear annulus or tire 168 is mounted on a similar wheel 215 provided with a rim for a tire, in turn mounted on a hub mounted for rotation on a spindle 220, with a brake backing plate 219 mounted on spindle 220 and the hub provided with a brake drum 218. The spindle 220 for the rear annulus or tire 168 is mounted in a slightly higher position than the spindle 217 for the front annulus or tire 166, so that the conductor 7, as in FIG. 23, will pass below rear annulus or tire 168, when moving between the horizontal rolls 190 and 191 and the roll assembly which includes vertical rolls 194 and horizontal rolls 195. The support for spindles 217 and 220 for the respective annuli or tires 166 and 168, as in FIGS. 23 and 31, conveniently includes a pair of upright posts 224 and 225, extending upwardly from the respective cross beam 170 and 171 and connected together at the top by a cross bar 226, each end of which extends downwardly for connection to the upper end of the respective post and connection thereto in a suitable manner, as by welding, posts 224 and 225 and cross bar 226 being conveniently tubular. For installing spindles 217 and 220 at different heights, a rectangular cutout 227 may be made in the upper edge of post 224 on opposite sides, so that spindle 217 may be placed therein and welded to the upper end of post 225. A similar cutout 228, but in each side of the opposite lower depending end of cross bar 226, may be provided for centering and welding spindle 220 in position. As will be evident, after the spindles 217 and 220 have been welded in position in cutouts 227 and 228, the cross bar 226 may be attached, as by welding, to the upper ends of posts 224 and 225. Also, post 214 for the upper roller 210 may be attached, as by welding, to the rear corner of cross bar 226, as in FIG. 31.

For controlling the pressure of the mechanical brake for each annulus or tire 166 and 168, an arrangement similar to that previously described in connection with FIGS. 19 and 20 may be used, thus including a pair of adjusting bolts 126' extending through the top of a box shaped bracket 230, mounted on the adjacent side beam 151 as in FIG. 22, with each adjusting bolt being engaged by a handle nut 129'. The lower end of each adjusting bolt 126' is connected to one leg of a forked link, similar to forked link 125 of FIG. 19 and mounted within bracket 230, while the opposite leg of the forked link, in lieu of being connected to a solid rod, such as rod 124 of FIG. 19, is instead connected to flexible wire cable 231 or 232, which leads to the respective brake, as in FIG. 22.

The tension trailer T', as in FIGS. 21 and 22, may be provided with fenders 235, disposed over the wheels 156 and hydraulic lines 236 and 237, respectively, leading from the hand pump 20' to the respective hydraulic cylinders 162 for raising and lowering the lifting arms L and the front wheel 153. A battery 238 may be mounted on one of the front beams 152, to provide current for automatically applying the electrically operated brakes of the wheels 156, in the event that the trailer becomes accidentally detached from the towing vehicle.

As will be evident, the wire stringing equipment of this invention fulfills to a marked degree the requirements and objects hereinbefore set forth. Thus, the pulling equipment of this invention, for pulling in a plurality of ropes, is readily mounted on a trailer and the desired pull is produced on a plurality of ropes simultaneously, with the ropes being wound onto a drum without interference between the ropes and the ropes are placed on the drums evenly. This is readily accomplished by the use of the dual or double drum D and the rope winding guide G. By the use of an automatic transmission, a speed of winding can be produced which is regulated to correspond to the tension and to produce the desired tension at all times. Also, by utilization of a disconnectable part of the apparatus, such as a free wheeling sprocket, the rope can be unwound at any desired speed for placement of the ropes for the next pulling operation. A locking device which engages locking plates on each drum prevents reverse rotation of the drums in the event of loss of power while the conductors are under tension, while the connection of the drums to the winding device, even during unwinding, as through the free wheeling sprocket, causes the winding device to be moved back and forth as the drums rotate, so that the ropes are also unwound evenly. The equipment of this invention which is adapted to handle a plurality of reels simultaneously is also conveniently mounted on a trailer, while the split bearings permit the reels to be loaded readily and the empty reels also to be unloaded readily. The brakes for the individual reels can be adjusted readily so that the braking effect on each reel is essentially uniform. In another type of equipment, adapted to handle a single reel, the braking effect is readily applied and may be adjusted to any desired tension by the brakes. In the single conductor tension trailer, the passage of the conductor about two resilient annuli or tires, each having a groove therein, and in a substantially "figure 8" arrangement, insures adequate frictional engagement of the conductor with the tires and thus insures that the braking effect will be transmitted to the conductor. The lower rollers for the front annulus and the upper roller for the rear annulus insure that the conductor will engage each annulus for the full amount of the desired circumference, while the horizontal rollers forwardly of the reel insure that the conductor will be unwound from the reel in a generally horizontal plane. The combination of two associated pairs of rollers, one pair being horizontal and the other vertical, also insures that the conductor will be guided into the groove of the desired annulus. By covering both the longer horizontal rollers and the two pairs of vertical and horizontal rollers with rubber or similar resilient material, damage to the conductor is prevented.

Although a preferred embodiment of a multiple conductor tension trailer and a single conductor tension trailer, as well as a preferred embodiment of a multiple rope pulling trailer, have been illustrated and described, it will be understood that other embodiments may exist and various changes made therein, without departing from the spirit and scope of this invention.

What is claimed is:

1. In wire stringing equipment, apparatus for pulling conductors under tension, comprising a pair of spaced, parallel rotatable drums, each drum being adapted to receive a pair of spaced, separate ropes for connection to a conductor; drive means for rotating said drums; a shaft disposed generally between said drums and extending parallel to the axes of rotation of said drums; rope guiding means including a sleeve movable back and forth on said shaft; an endless drive member movable adjacent said shaft along a path extending from approximately midway of said shaft to one end of said shaft, said path having oppositely disposed sides; and means connecting one point on said endless member with said rope guide to move said rope guide back and forth along said shaft and between the ends thereof, as said endless member moves around said path.

2. In apparatus as set forth in claim 1, wherein said connecting means includes a roller mounted on a pin extending upwardly from said endless member; and flange means depending from said rope guide for engagement with said roller, said flange means having spaced sides transverse to the sides of the path of said endless member.

3. In wire stringing equipment for pulling conductors for placement on poles, towers and the like, apparatus comprising rotatable drums for receiving a plurality of ropes for connection to said conductors; a rope guide for guiding said ropes onto said drums; means for rotating said drums; means for moving said rope guide back and forth across said drums; drive means for said drum rotating means and said rope guide moving means; and means for disconnecting said drive means from said drum rotating means and said rope guide moving means, with said rope guide moving means connected with said drum rotating means.

4. In apparatus as defined in claim 3, including a drive output shaft; a sleeve fixedly mounted on said shaft; a ring rotatably mounted on said sleeve; and removable means interconnecting said ring and said sleeve for normally preventing rotation of said ring on said sleeve.

5. In apparatus for pulling conductors under tension, a pair of spaced, parallel, rotatable drums, each drum having a separate longitudinal portion to receive a pair of separate spaced ropes for connection to a conductor; a shaft disposed parallel to the axes of said drums and centrally between said drums but offset from the plane of said drum axes; a sleeve movable on said shaft and having a length corresponding to one half the length of said shaft; a pair of arms mounted on each end of said shaft and extending in opposite directions toward the respective drums; a rope guide having a slot therein and connected to the outer end of each said arm, each said rope guide extending over a rope receiving portion of a drum and being generally arcuate to correspond to the periphery of said drum; an arcuate plate connected between each pair of guides over the respective drum; a roller mounted on the outer end of each guide; and means engaging said rollers to maintain said guides in spaced relation to said drums during movement of said guides.

6. In apparatus for pulling conductors under tension, a multiple rope pulling trailer comprising a wheeled frame having lower side beams and members extending upwardly from each side beam; a pair of parallel drums mounted for rotation between said side members at front and rear positions, each drum having a central sprocket and a rope receiving portion, on which a rope connected to a conductor is wound, at each side of said sprocket; a shaft extending between said side members centrally of said frame and above the axes of said drums; a guide having a plurality of slots through which said ropes extend to the respective rope receiving portion of the respective drum, said rope guide being movable back and forth on said shaft; a platform extending between said side beams; an engine mounted on said platform; a transmission including a hydraulic coupling mounted on said platform and driven by said engine; a first speed reduction unit mounted on said platform and driven by said transmission, said first speed reduction unit having an output shaft disposed centrally with respect to said drums; a second speed reduction unit; means driven by said second speed reduction unit for moving said rope guide back and forth along said shaft; a pair of chains driven from said output shaft of said first speed reduction unit and respectively engaging the sprockets of said drums; a third chain driven from said output shaft of said first speed reduction unit and driving said second speed reduction unit; and means mounted on said side members at one side of said frame for controlling said engine.

7. In wire stringing equipment, apparatus for pulling conductors under tension comprising a pair of spaced, parallel rotatable drums; a pair of longitudinally spaced, circumferentially extending flanges adjacent the center of each said drum to separate each said drum into two rope receiving portions adapted to receive a pair of spaced, separate ropes for connection to a conductor; a plurality of circumferentially spaced, radially outwardly extending flanges between said spaced flanges; a sprocket disposed between said circumferential flanges on each drum, with the sprocket on one drum laterally spaced from the sprocket on the other drum; and drive means for rotating said drum and including laterally spaced chains engaging the sprockets on the respective drums.

References Cited in the file of this patent

UNITED STATES PATENTS

| | | |
|---|---|---|
| 2,475,983 | Osgood | July 12, 1949 |
| 2,545,895 | Parmenter | Mar. 20, 1951 |
| 2,589,172 | Wagner | Mar. 11, 1952 |
| 2,599,423 | Ziegler | June 3, 1952 |
| 2,635,827 | Stemm et al. | Apr. 21, 1953 |
| 2,703,218 | Haskell | Mar. 1, 1955 |
| 2,703,220 | Curtiss | Mar. 1, 1955 |
| 2,779,544 | Hafer | Jan. 29, 1957 |
| 2,780,419 | Hall | Feb. 5, 1957 |
| 2,941,746 | Hunt | June 21, 1960 |